(12) United States Patent
Zoran et al.

(10) Patent No.: US 10,092,879 B2
(45) Date of Patent: Oct. 9, 2018

(54) SINGLE MODULE INTEGRATED AFTERTREATMENT MODULE

(71) Applicant: Cummins Emission Solutions, Inc., Columbus, IN (US)

(72) Inventors: Randolph G. Zoran, McFarland, WI (US); Ryan M. Johnson, Cottage Grove, WI (US); David M. Sarcona, Oregon, WI (US); Carl A. McDonald, Greenwood, IN (US); Kenneth R. Federle, Columbus, IN (US); John G. Buechler, Indianapolis, IN (US); Scott Lubenow, Fitchburg, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/539,886

(22) PCT Filed: Dec. 22, 2015

(86) PCT No.: PCT/US2015/067302
§ 371 (c)(1),
(2) Date: Jun. 26, 2017

(87) PCT Pub. No.: WO2016/109320
PCT Pub. Date: Jul. 7, 2016

(65) Prior Publication Data
US 2017/0361273 A1    Dec. 21, 2017

Related U.S. Application Data

(60) Provisional application No. 62/098,667, filed on Dec. 31, 2014.

(51) Int. Cl.
*F01N 3/10* (2006.01)
*B01D 53/94* (2006.01)
(Continued)

(52) U.S. Cl.
CPC ....... *B01D 53/9431* (2013.01); *B01D 46/521* (2013.01); *B01D 53/864* (2013.01);
(Continued)

(58) Field of Classification Search
CPC .............. F01N 13/0097; F01N 4/0211; F01N 2450/30; B01N 3/2066; B01D 53/944; B01D 53/864
(Continued)

(56) References Cited

U.S. PATENT DOCUMENTS

| 4,673,423 A | 6/1987 | Yumlu |
| 5,043,146 A | 8/1991 | Ishikawa et al. |

(Continued)

FOREIGN PATENT DOCUMENTS

| EM | 002840355-001 | 10/2015 |
| EM | 002840355-002 | 10/2015 |

(Continued)

OTHER PUBLICATIONS

International Search Report and Written Opinion for PCT/US2015/067302, dated Mar. 11, 2016, 10 pages.
(Continued)

*Primary Examiner* — Tom P Duong
(74) *Attorney, Agent, or Firm* — Foley & Lardner LLP

(57) ABSTRACT

A selective catalytic reduction system may include a single housing defining a single centerline axis. The selective catalytic reduction system may also include a diesel particulate filter disposed within the single housing and having a DPF center axis aligned with the single centerline axis. The selective catalytic reduction system may also include an SCR catalyst disposed within the single housing and having a center axis aligned with the single centerline axis. In some implementations, the diesel particulate filter may include
(Continued)

one or more SiC filters. In some implementations, the SCR catalyst may include one or more extruded SCR catalysts.

19 Claims, 3 Drawing Sheets

(51) Int. Cl.
F01N 3/021 (2006.01)
F01N 3/20 (2006.01)
F01N 13/00 (2010.01)
B01D 46/52 (2006.01)
B01D 53/86 (2006.01)

(52) U.S. Cl.
CPC ......... B01D 53/865 (2013.01); B01D 53/944 (2013.01); B01D 53/9477 (2013.01); F01N 3/0211 (2013.01); F01N 3/2066 (2013.01); F01N 13/0097 (2014.06); B01D 2255/20738 (2013.01); F01N 2450/30 (2013.01)

(58) Field of Classification Search
USPC ............................. 422/168, 170, 176, 177
See application file for complete search history.

(56) References Cited

U.S. PATENT DOCUMENTS

| | | | |
|---|---|---|---|
| 5,611,832 A | 3/1997 | Suzuki et al. | |
| 6,475,944 B1 * | 11/2002 | Yang | B01D 53/8628 423/239.1 |
| D590,419 S | 4/2009 | Duffek et al. | |
| 8,609,047 B2 | 12/2013 | Dotzel et al. | |
| D702,735 S | 4/2014 | Sandou | |
| D757,919 S | 5/2016 | Kimura | |
| D794,100 S | 8/2017 | McDonald et al. | |
| 2003/0221424 A1 * | 12/2003 | Woerner | F01N 3/023 60/297 |
| 2007/0039316 A1 | 2/2007 | Bosanec et al. | |
| 2008/0060351 A1 | 3/2008 | Pawson et al. | |
| 2009/0084094 A1 | 4/2009 | Goss et al. | |
| 2009/0136387 A1 | 5/2009 | Picton et al. | |
| 2010/0242451 A1 * | 9/2010 | Werni | F01N 3/0335 60/297 |
| 2010/0300082 A1 | 12/2010 | Zhang | |
| 2011/0047973 A1 | 3/2011 | Wilhelm et al. | |
| 2011/0052454 A1 | 3/2011 | Kato | |
| 2011/0099978 A1 * | 5/2011 | Davidson | F01N 3/2066 60/274 |
| 2012/0004863 A1 | 1/2012 | Ardanese et al. | |
| 2012/0210697 A1 | 8/2012 | Garimella et al. | |
| 2013/0125524 A1 | 5/2013 | Plummer et al. | |
| 2013/0213008 A1 | 8/2013 | Kumar et al. | |
| 2014/0007562 A1 | 1/2014 | Justin | |
| 2014/0260202 A1 | 9/2014 | Bays et al. | |
| 2014/0262590 A1 | 9/2014 | Daborn et al. | |
| 2014/0363358 A1 | 12/2014 | Udd et al. | |
| 2014/0373721 A1 | 12/2014 | Sandou et al. | |
| 2015/0000389 A1 | 1/2015 | Runde et al. | |
| 2015/0224870 A1 | 8/2015 | Shin et al. | |
| 2016/0069239 A1 | 3/2016 | Freeman et al. | |
| 2016/0076430 A1 | 3/2016 | Freeman et al. | |
| 2016/0115847 A1 | 4/2016 | Chapman et al. | |
| 2016/0245207 A1 | 8/2016 | Ball et al. | |
| 2016/0326931 A1 | 11/2016 | Freeman et al. | |
| 2017/0036165 A1 | 2/2017 | Schmid et al. | |
| 2017/0043295 A1 | 2/2017 | Minezawa et al. | |
| 2017/0074146 A1 | 3/2017 | Maletic et al. | |
| 2017/0089248 A1 | 3/2017 | Evans et al. | |

FOREIGN PATENT DOCUMENTS

| | | |
|---|---|---|
| EM | 002840355-003 | 10/2015 |
| EM | 002840355-004 | 10/2015 |
| WO | WO 2016/109321 | 7/2016 |
| WO | WO 2016/109323 | 7/2016 |

OTHER PUBLICATIONS

International Search Report and Written Opinion for PCT/US2015/067317, dated Apr. 22, 2016, 18 pages.
International Search Report and Written Opinion for PCT/US2015/067324, dated Feb. 23, 2016, 8 pages.

* cited by examiner

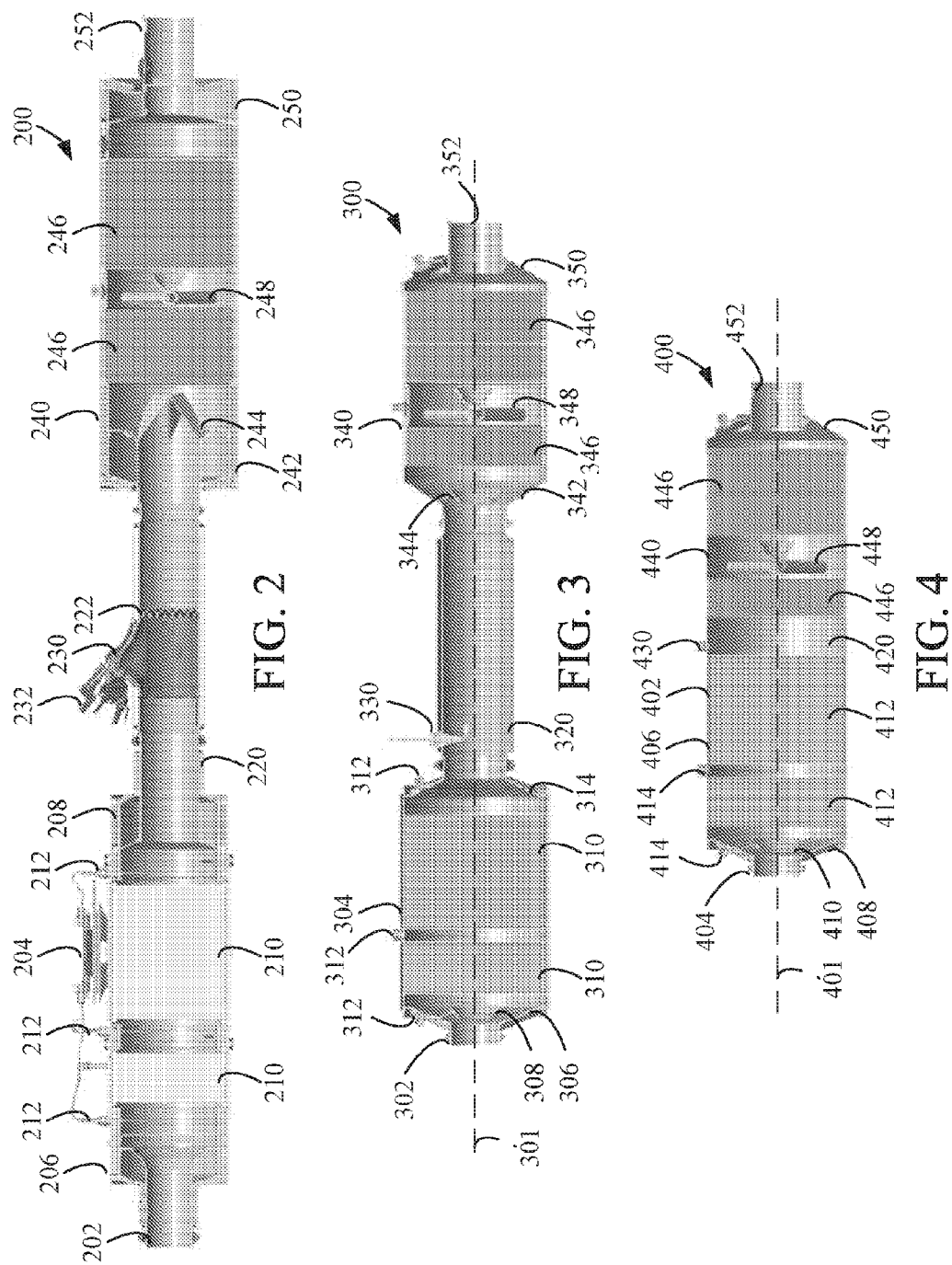

SINGLE MODULE INTEGRATED AFTERTREATMENT MODULE

CROSS REFERENCE TO RELATED APPLICATIONS

The present application is a National Stage of PCT Application No. PCT/US2015/067302, filed Dec. 22, 2015, which claims the benefit of priority to U.S. Provisional Patent Application No. 62/098,667, filed on Dec. 31, 2014. The contents of both applications are herein incorporated by reference in their entirety and for all purposes.

TECHNICAL FIELD

The present application relates generally to the field of after treatment systems for internal combustion engines.

BACKGROUND

For internal combustion engines, such as diesel or natural gas engines, nitrogen oxide ($NO_x$) compounds may be emitted in the exhaust of a vehicle. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system. A reductant such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber.

SUMMARY

One implementation relates to a selective catalytic reduction system may include a single housing defining a centerline axis, a diesel particulate filter disposed within the single housing and having a diesel particulate filter center axis aligned with the single centerline axis, and a selective catalytic reduction catalyst disposed within the single housing downstream of the diesel particulate filter and having a center axis aligned with the single centerline axis.

In some implementations the diesel particulate filter includes one or more SiC filters. In some implementations the selective catalytic reduction catalyst includes one or more extruded SCR catalysts. In some implementations, the single housing has a single inlet and a single outlet. In some implementations the diesel particulate filter is selectively removeable from the single housing through a service opening. In some implementations, the selective catalytic reduction system further includes an exhaust noise attenuation component. In some implementations, the single housing includes one or more deflector plates at an inlet upstream of the diesel particulate filter. In some implementations, the single housing includes one or more deflector plates at an inlet upstream of the selective catalytic reduction catalyst. In some implementations, the single housing has a single inlet and a single outlet. In some implementations, the single housing defines a decomposition reactor downstream of the diesel particulate filter and upstream of the selective catalytic reduction catalyst. In some further implementations, a diameter of the decomposition reactor defined by the single housing is the same as a diameter of the single housing containing the diesel particulate filter.

Another implementation relates to a system that includes an engine and an aftertreatment system in fluid communication with and configured to receive exhaust from the engine. The aftertreatment system may include a single housing defining a centerline axis, a diesel particulate filter disposed within the single housing and having a diesel particulate filter center axis aligned with the single centerline axis, and a selective catalytic reduction catalyst disposed within the single housing downstream of the diesel particulate filter and having a center axis aligned with the single centerline axis.

In some implementations the diesel particulate filter includes one or more SiC filters. In some implementations the selective catalytic reduction catalyst includes one or more extruded SCR catalysts. In some implementations, the single housing has a single inlet and a single outlet. In some implementations the diesel particulate filter is selectively removeable from the single housing through a service opening. In some implementations, the selective catalytic reduction system further includes an exhaust noise attenuation component. In some implementations, the single housing includes one or more deflector plates at an inlet upstream of the diesel particulate filter. In some implementations, the single housing includes one or more deflector plates at an inlet upstream of the selective catalytic reduction catalyst. In some implementations, the single housing has a single inlet and a single outlet. In some implementations, the single housing defines a decomposition reactor downstream of the diesel particulate filter and upstream of the selective catalytic reduction catalyst. In some further implementations, a diameter of the decomposition reactor defined by the single housing is the same as a diameter of the single housing containing the diesel particulate filter.

Yet another implementation relates to a selective catalytic reduction system that includes a main housing defining a volume, a first inner housing housed within the main housing, and a second inner housing housed within the main housing. An outlet of the first inner housing is in fluid communication with the volume defined by the main housing, and the first inner housing defines a first centerline axis. An inlet of the second inner housing is in fluid communication with the volume defined by the main housing, and the second inner housing defines a second centerline axis that is parallel to the first centerline axis. The selective catalytic reduction system further includes a diesel particulate filter disposed within the first inner housing and having a diesel particulate filter center axis aligned with the first centerline axis and a selective catalytic reduction catalyst disposed within the second inner housing downstream of the diesel particulate filter and having a center axis aligned with the second centerline axis.

In some implementations, the volume defined by the main housing is a decomposition reactor. In some further implementations, the diesel particulate filter comprises one or more SiC filters and the selective catalytic reduction catalyst comprises one or more extruded SCR catalysts.

BRIEF DESCRIPTION OF THE DRAWINGS

The details of one or more implementations are set forth in the accompanying drawings, the claims, and the description below. Other features, aspects, and advantages of the disclosure will become apparent from the description, the drawings, and the claims, in which:

FIG. 2 is a side cross-sectional view of an example selective catalytic reduction system for an exhaust system;

FIG. 3 is a side cross-sectional view of an example single axis centerline integrated selective catalytic reduction system for an exhaust system;

FIG. 4 is a side cross-sectional view of an example compact single axis, single module integrated selective catalytic reduction system for an exhaust system;

Figure 1:
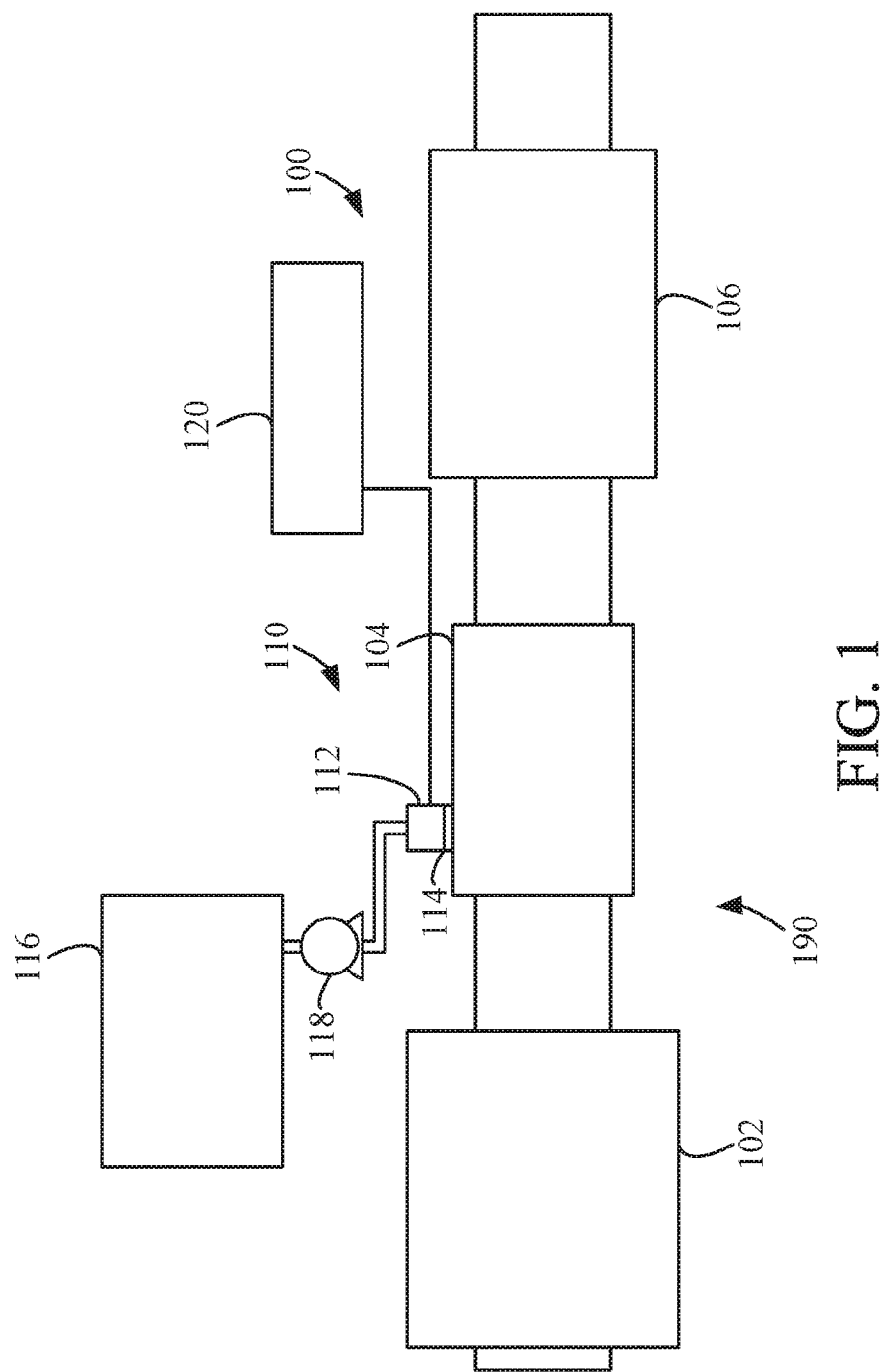
FIG. 1 is a block schematic diagram of an example selective catalytic reduction system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for injecting and mixing reductant into an exhaust flow of a vehicle and SCR aftertreatment systems. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In exhaust systems with SCR aftertreatment systems, the aftertreatment system components, such as a diesel particulate filter (DPF), a reductant delivery system, a decomposition chamber or reactor, a SCR catalyst, a diesel oxidation catalyst (DOC), one or more sensors, and/or one or more exhaust gas fluid mixing devices, may be separated out into separate sections or housings for the exhaust system. Such separate housings may permit modularity for the aftertreatment system, but the multiple housing approach also may necessitate several clamped joints in the system and may require a large amount of space for the aftertreatment system on the vehicle.

In some implementations, the different components of the aftertreatment system are combined into a single module integrated aftertreatment system. Such a single module integrated system may reduce the spatial area the aftertreatment system occupies for a vehicle or other system to which the aftertreatment system is incorporated, reduce the weight of the aftertreatment system by reducing the housing components and intermediary exhaust conduits utilized, reduce the cost of the aftertreatment system by eliminating several components, and reduce assembly costs for the aftertreatment system while maintaining efficiency of the aftertreatment system.

In some implementations, the aftertreatment system may be a single axis centerline integrated selective catalytic reduction system for an exhaust system that integrates the components of the aftertreatment system into a single inline design. The components of the aftertreatment system may be combined into a single or one or more reduced length housings and several features of existing aftertreatment systems may be eliminated. For instance, improved inlet and outlet openings to housings of the aftertreatment system components may reduce the overall length of the housing for such components. In addition, utilization of water capable substrate mats enable the elimination of water traps for the system, thereby reducing the overall length further still. Furthermore, utilization of improved filters and substrates, such as SiC (or other type) filters and extruded SCR catalysts (or catalysts formed by other processes), may reduce the volume needed for the DPF and SCR catalyst components, thereby further reducing the length of the aftertreatment system. Still further, usage of a mid-bed $NH_3$ sensor for the SCR catalyst (i.e., place an $NH_3$ sensor between a first upstream SCR catalyst and a second downstream SCR catalyst) may further reduce the overall length of the aftertreatment system by eliminating the need for other sensors to detect $NH_3$ in the aftertreatment system. Compact mixing components may be integrated into the aftertreatment system to still further reduce the length of the aftertreatment system. In some implementations, $NH_3$ delivery may be improved to efficiently introduce the $NH_3$ into the aftertreatment system over a short longitudinal length while maintaining sufficient uniformity in the exhaust gas flow, such as through the use of a compact $NH_3$ mixer with a reductant dosing system. In other implementations, a single housing may be utilized having parallel internal housings that may further still reduce the overall length.

II. Overview of Aftertreatment System

FIG. 1 depicts an aftertreatment system 100 having an example reductant delivery system 110 for an exhaust system 190. The aftertreatment system 100 includes a DPF 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas. In some implementations, the exhaust system 190 may include a DOC and an SCR catalyst 106 without the DPF 102.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

III. Example Selective Catalytic Reduction System for an Exhaust System

FIG. 2 depicts a side cross-sectional view of an example selective catalytic reduction system 200 for an exhaust system. The selective catalytic reduction system 200 includes an inlet 202 in fluid communication with an engine, such as a diesel engine, to receive exhaust gases output from the engine. In some implementations, one or more turbochargers or other exhaust components may be positioned between the engine and the inlet 202.

The inlet 202 is in fluid communication with a DPF 204 that is configured to remove particulate matter, such as soot, from exhaust gas flowing in the exhaust system. The DPF 204 includes an inlet portion 206, where the exhaust gas is received and allowed to expand to a cross-sectional area of the DPF 204 to increase the area of the exhaust gas received while maintaining a substantial uniformity to the distribution of particulate matter in the exhaust gas.

The DPF 204 also includes an outlet portion 208 that collects the exhaust gas downstream of one or more filters 210. In some implementations, the DPF 204 may include one or more sensors 212 coupled to an outer shell of the DPF 204 and configured to detect one or more characteristics of the exhaust gas flowing through the DPF 204 (such as $NO_x$ content, CO content, etc.), The exhaust gas exits via the outlet portion 208 after having particulate matter substantially filtered from the exhaust gas and/or converting the particulate matter into carbon dioxide using the filters 210.

The DPF 204 is in fluid communication with an inlet of a decomposition chamber 220. That is, exhaust gas flows from the outlet portion 208 of the DPF 204 to the decomposition chamber 220 that is configured to convert a reductant, such as urea, aqueous ammonia, or DEF, into non-aqueous ammonia. The decomposition chamber 220 includes a reductant delivery system 230 having a dosing module 232 configured to dose the reductant into the decomposition chamber 220. The dosed reductant droplets then undergo the processes of evaporation, thermolysis, and hydrolysis to form gaseous ammonia within the decomposition chamber 220. The decomposition chamber 220 includes an inlet in fluid communication with the DPF 204 to receive the exhaust gas containing $NO_x$ emissions and an outlet for the exhaust gas, $NO_x$ emissions, ammonia, and/or remaining reductant to flow to an SCR catalyst 240.

The decomposition chamber 220 includes a mixer 222 disposed within the decomposition chamber 220 and positioned downstream of the reductant delivery system 230. The mixer 222 may include a gridded member, a mesh member, etc. that is configured to introduce vortexes to the exhaust gas flowing through the decomposition chamber 220. Thus, when reductant is dosed by the reductant delivery system 230, the mixer 222 further churns the exhaust gas and $NH_3$ mixture to increase the uniformity.

The decomposition chamber 220 is in fluid communication with the SCR catalyst 240. That is, exhaust from the decomposition chamber 220 enters an inlet portion 242 of the SCR catalyst 240 that is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 240 includes the inlet portion 242 in fluid communication with the decomposition chamber 220 from which exhaust gas and reductant is received. The inlet portion 242 includes a second mixer 244 configured to further mix the exhaust gas and $NH_3$ and to increase the uniformity of the exhaust gas and $NH_3$ entering into the SCR catalyst 240. The exhaust gas and $NH_3$ mixture flows through one or more catalysts 246. The one or more catalysts 246 may include any suitable catalyst such as, for example, platinum, palladium, rhodium, cerium, iron, manganese, copper, vanadium based catalyst, any other suitable catalyst, or a combination thereof. The one or more catalysts 246 can be disposed on a suitable substrate such as, for example, a ceramic (e.g., cordierite) or metallic (e.g., kanthal) monolith core which can, for example, define a honeycomb structure. A washcoat can also be used as a carrier material for the aforementioned catalysts. Such washcoat materials can include, for example, aluminum oxide, titanium dioxide, silicon dioxide, any other suitable washcoat material, or a combination thereof.

In some implementations, a sensor assembly 248 may be disposed within the shell of the SCR catalyst 240 in between an upstream catalyst 246 and a downstream catalyst 246 to capture a portion of the exhaust gas to be transported to a sensor to detect a $NO_x$ content of the exhaust gas, a $NH_3$ content of the exhaust gas, and/or a ratio of $NO_x$ to $NH_3$ content of the exhaust gas. The sensor assembly 248 may be constructed in accordance with one or more of the embodiments disclosed by U.S. application Ser. No. 13/764,165, entitled "Exhaust Gas Sensor Module," and/or U.S. Pat. No. 8,756,913, entitled "Exhaust Gas Sensor Module, the disclosures of which are hereby incorporated herein in their entirety.

The SCR catalyst 240 also includes an outlet portion 250 in fluid communication with the one or more catalysts 246 and an outlet 252 of the exhaust system. The outlet portion 250 collects the exhaust gas downstream of the one or more catalysts 246. In some implementations, the outlet portion 250 may include a water trap, such as a porous inner tube within the outlet portion 250 and one or more openings in an outer shell of the outlet portion 250 to allow water out of the SCR catalyst 240.

IV. Example Single Axis Centerline Integrated Selective Catalytic Reduction System for an Exhaust System FIG. 3 depicts a side cross-sectional view of a single axis centerline integrated selective catalytic reduction system 300 for an exhaust system. The single axis centerline integrated selective catalytic reduction system 300 includes all the catalysts and filters on a single centerline axis 301. The single axis centerline integrated selective catalytic reduction system 300 includes an inlet 302 in fluid communication with an engine, such as a diesel engine, to receive exhaust gases output from the engine. In some implementations, one or more turbochargers or other exhaust components may be positioned between the engine and the inlet 302.

The inlet 302 is in fluid communication with a DPF 304 that is configured to remove particulate matter, such as soot, from exhaust gas flowing in the exhaust system. The DPF 304 has a DPF center axis aligned with the single axis 301. The DPF 304 includes an inlet portion 306, where the exhaust gas is received and allowed to expand to a cross-sectional area of the DPF 304 to increase the area of the exhaust gas received while maintaining a substantial uniformity to the distribution of particulate matter in the exhaust gas. In the implementation shown, the inlet portion 306 includes one or more deflector plates 308 to deflect flow from the inlet 302 outwardly while flowing downstream towards the one or more filters 310. The inlet portion 306 is designed to allow exhaust gas dispersion within a very short axial length of the inlet portion 306. Therefore the length of the DPF 304 can be minimized in order to meet any vehicle constraints on system length. In some implementations, the one or more filters 310 may be selected based on an engine flow rate.

The DPF 304 also includes an outlet portion 314 that collects the exhaust gas downstream of the one or more filters 310. The outlet portion 314 is designed to allow the exhaust gas to contract within a very short axial length of the outlet portion 314. Therefore the length of the DPF 304 can be minimized in order to meet any vehicle constraints on system length. In some implementations, the one or more filters 310 may be SiC or other type filters. The one or more filters 310 may have a reduced volume in comparison to the one or more filters 210, such as a 25% reduced volume. The reduced filter volume for the one or more filters 310 can be enabled by improved filter technologies or exhaust conditions and/or constituents that allow volume reduction. In some implementations, the DPF 304 may include one or more sensors 312 coupled to an outer shell of the DPF 304 and configured to detect one or more characteristics of the exhaust gas flowing through the DPF 304 (such as $NO_x$ content, CO content, etc.), The exhaust gas exits via the outlet portion 314 after having particulate matter substantially filtered from the exhaust gas and/or converting the particulate matter into carbon dioxide using the filters 310.

The DPF 304 is in fluid communication with an inlet of a decomposition chamber 320. That is, exhaust gas flows from the outlet portion 314 of the DPF 304 to the decomposition chamber 320 that is configured to convert a reductant, such as urea, aqueous ammonia, or DEF, into ammonia. The decomposition chamber 320 includes a reductant delivery system 330 having a dosing module configured to dose the reductant into the decomposition chamber 320. The decomposition chamber 320 may have substantially the same cross-section area and/or diameter as the DPF 304 and/or SCR catalyst 340. The decomposition chamber 320 may also incorporate features of the DPF outlet 314 and the SCR inlet portion 342 into the decomposition chamber 320. The dosed reductant droplets then undergo the processes of evaporation, thermolysis, and hydrolysis to form gaseous ammonia within the decomposition chamber 320. The decomposition chamber 320 includes an inlet in fluid communication with the DPF 304 to receive the exhaust gas containing $NO_x$ emissions and an outlet for the exhaust gas, $NO_x$ emissions, ammonia, and/or remaining reductant to flow to an SCR catalyst 340.

The decomposition chamber 320 is in fluid communication with the SCR catalyst 340. That is, exhaust from the decomposition chamber 320 enters an inlet portion 342 of the SCR catalyst 340 that is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 340 has a SCR center axis aligned with the single axis 301. The SCR catalyst 340 includes inlet portion 342 in fluid communication with the decomposition chamber 320 from which exhaust gas and reductant is received. The inlet portion 342 includes one or more deflector plates 344 to deflect flow from the inlet portion 342 outwardly while flowing downstream towards one or more catalysts 346 and configured to further mix the exhaust gas and $NH_3$ to increase the uniformity of the exhaust gas and $NH_3$ entering into the SCR catalyst 240. The inlet portion 342 is designed to allow exhaust gas dispersion within a very short axial length of the inlet portion 342. Therefore the length of the SCR catalyst 340 can be minimized in order to meet any vehicle constraints on system length.

The exhaust gas and $NH_3$ mixture flows through one or more catalysts 346. The one or more catalysts 346 may include any suitable catalyst such as, for example, platinum, palladium, rhodium, cerium, iron, manganese, copper, vanadium based catalyst, any other suitable catalyst, or a combination thereof. The one or more catalysts 346 can be disposed on a suitable substrate such as, for example, a ceramic (e.g., cordierite) or metallic (e.g., kanthal) monolith core which can, for example, define a honeycomb structure. A washcoat can also be used as a carrier material for the aforementioned catalysts. Such washcoat materials can include, for example, aluminum oxide, titanium dioxide, silicon dioxide, any other suitable washcoat material, or a combination thereof. In some implementations, the one or more catalysts 346 may be extruded SCR catalysts. The extruded SCR catalysts may have a reduced volume in comparison to the one or more catalysts 246, such as a 40% reduced volume. It should be noted, however, that the catalysts may be formed by other processes as well. The volume reduction of the one or more catalysts 346 can be enabled by improved SCR technologies or exhaust conditions and/or constituents that allow volume reduction. In some implementations, the one or more catalysts 346 may be selected based on an engine flow rate. In some implementations, the one or more catalysts 346 may include a water resistant and/or water capable substrate mat. That is, the one or more catalysts 346 may include a water capable substrate mat wrapped around the substrate for the one or more catalysts 346 that experiences a substantially reduced performance impact when water is introduced into the substrate mat. In particular, the substrate mat pressure is not significantly reduced during use after exposure to water.

In some implementations, a sensor assembly 348 may be disposed within the shell of the SCR catalyst 340 in between an upstream catalyst 346 and a downstream catalyst 346 to capture a portion of the exhaust gas to be transported to a sensor to detect a $NO_x$ content of the exhaust gas, a $NH_3$ content of the exhaust gas, and/or a ratio of $NO_x$ to $NH_3$ content of the exhaust gas. The sensor assembly 348 may be constructed in accordance with one or more of the embodiments disclosed by U.S. application Ser. No. 13/764,165, entitled "Exhaust Gas Sensor Module," and/or U.S. Pat. No. 8,756,913, entitled "Exhaust Gas Sensor Module, the disclosures of which are hereby incorporated herein in their entirety.

The SCR catalyst 340 also includes an outlet portion 350 in fluid communication with the one or more catalysts 346 and an outlet 352 of the exhaust system. The outlet portion 350 collects the exhaust gas downstream of the one or more catalysts 346. The outlet portion 350 may omit a water trap based on the usage of a water capable substrate mat, thereby eliminating a component from the single axis centerline integrated selective catalytic reduction system 300. The outlet portion 350 is designed to allow the exhaust gas to contract within a very short axial length of the outlet portion 350. Therefore the length of the SCR catalyst 340 can be minimized in order to meet any vehicle constraints on system length.

FIG. 4 depicts a side cross-sectional view of a single axis, single module centerline integrated selective catalytic reduction system 400 for an exhaust system. The single axis centerline integrated selective catalytic reduction system 400 includes all the catalysts and filters on a single centerline axis 401 and within a single housing 402. The single axis centerline integrated selective catalytic reduction system 400 includes an inlet 404 in fluid communication with an engine, such as a diesel engine, to receive exhaust gases output from the engine. In some implementations, one or more turbochargers or other exhaust components may be positioned between the engine and the inlet 404.

The inlet 404 is in fluid communication with a DPF 406 that is configured to remove particulate matter, such as soot, from exhaust gas flowing in the exhaust system. The DPF 406 has a DPF center axis aligned with the single axis 401. The DPF 406 includes an inlet portion 408, where the exhaust gas is received and allowed to expand to a cross-sectional area of the DPF 406 to increase the area of the exhaust gas received while maintaining a substantial uniformity to the distribution of particulate matter in the exhaust gas. In the implementation shown, the inlet portion 408 includes one or more deflector plates 410 to deflect flow from the inlet 404 outwardly while flowing downstream towards the one or more filters 412. The inlet portion 408 is designed to allow exhaust gas dispersion within a very short axial length of the inlet portion 408. Therefore the length of the DPF 406 can be minimized in order to meet any vehicle constraints on system length. In some implementations, the one or more filters 412 may be selected based on an engine flow rate. In some implementations, the one or more filters 412 may be SiC or other type filters. The one or more filters 412 may have a reduced volume in comparison to the one or more filters 210, such as a 25% reduced volume. The reduced filter volume for the one or more filters 412 can be enabled by improved filter technologies or exhaust conditions and/or constituents that allow volume reduction. In some implementations, the DPF 406 may include one or more sensors 414 coupled to the single housing 402 containing the DPF 406 and configured to detect one or more characteristics of the exhaust gas flowing through the DPF 406 (such as $NO_x$ content, CO content, etc.), The exhaust gas exits downstream from the one of more filters 412 into a decomposition chamber 420 after particulate matter is substantially filtered from the exhaust gas and/or converted into carbon dioxide using the filters 412.

The exhaust gas flows from the DPF 406 to the decomposition chamber 420 that is configured to convert a reductant, such as urea, aqueous ammonia, or DEF, into non-aqueous ammonia. The decomposition chamber 420 includes a reductant delivery system 430 having a dosing module configured to dose the reductant into the decomposition chamber 420. The decomposition chamber 420 may have substantially the same cross-section area and/or diameter as the DPF 406 and/or SCR catalyst 440. The decomposition chamber 420 may also incorporate features of the DPF outlet 314 and the SCR inlet portion 342 of the single axis centerline integrated selective catalytic reduction system 300 into the decomposition chamber 420. In some implementations, the reductant delivery system 430 includes a gaseous ammonia delivery system and/or a liquid reductant delivery system that rapidly converts to ammonia.

The decomposition chamber 420 is in fluid communication with the SCR catalyst 440. That is, exhaust from the decomposition chamber 420 enters the SCR catalyst 440 that is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 440 has a SCR center axis aligned with the single axis 401.

The exhaust gas and $NH_3$ mixture flows through one or more catalysts 446. The one or more catalysts 446 may include any suitable catalyst such as, for example, platinum, palladium, rhodium, cerium, iron, manganese, copper, vanadium based catalyst, any other suitable catalyst, or a combination thereof. The one or more catalysts 446 can be disposed on a suitable substrate such as, for example, a ceramic (e.g., cordierite) or metallic (e.g., kanthal) monolith core which can, for example, define a honeycomb structure. A washcoat can also be used as a carrier material for the aforementioned catalysts. Such washcoat materials can include, for example, aluminum oxide, titanium dioxide, silicon dioxide, any other suitable washcoat material, or a combination thereof. In some implementations, the one or more catalysts 446 may be extruded SCR catalysts. The extruded SCR catalysts may have a reduced volume in comparison to the one or more catalysts 246, such as a 40% reduced volume. It should be noted, however, that the catalysts may be formed by other processes as well. The volume reduction of the one or more catalysts 446 can be enabled by improved SCR technologies or exhaust conditions and/or constituents that allow volume reduction. In some implementations, the one or more catalysts 446 may be selected based on an engine flow rate. In some implementations, the one or more catalysts 446 may include a water resistant and/or water capable substrate mat. That is, the one or more catalysts 446 may include a water capable substrate mat wrapped around the substrate for the one or more catalysts 446 that experiences a substantially reduced performance impact when water is introduced into the substrate mat. In particular, the substrate mat pressure is not significantly reduced during use after exposure to water.

In some implementations, a sensor assembly 448 may be disposed within the single housing 402 containing the SCR catalyst 440 in between an upstream catalyst 446 and a downstream catalyst 446 to capture a portion of the exhaust gas to be transported to a sensor to detect a $NO_x$ content of the exhaust gas, a $NH_3$ content of the exhaust gas, and/or a ratio of $NO_x$ to $NH_3$ content of the exhaust gas. The sensor assembly 448 may be constructed in accordance with one or more of the embodiments disclosed by U.S. application Ser. No. 13/764,165, entitled "Exhaust Gas Sensor Module," and/or U.S. Pat. No. 8,756,913, entitled "Exhaust Gas Sensor Module, the disclosures of which are hereby incorporated herein in their entirety.

The SCR catalyst 440 also includes an outlet portion 450 in fluid communication with the one or more catalysts 446 and an outlet 452 of the exhaust system. The outlet portion 450 collects the exhaust gas downstream of the one or more catalysts 446. The outlet portion 450 may omit a water trap based on the usage of a water capable substrate mat, thereby eliminating a component from the single axis, single module centerline integrated selective catalytic reduction system 400. The outlet portion 450 is designed to allow the exhaust gas to contract within a very short axial length of the outlet portion 450. Therefore, the length of the SCR catalyst 440 can be minimized in order to meet any vehicle constraints on system length.

Figure 5:
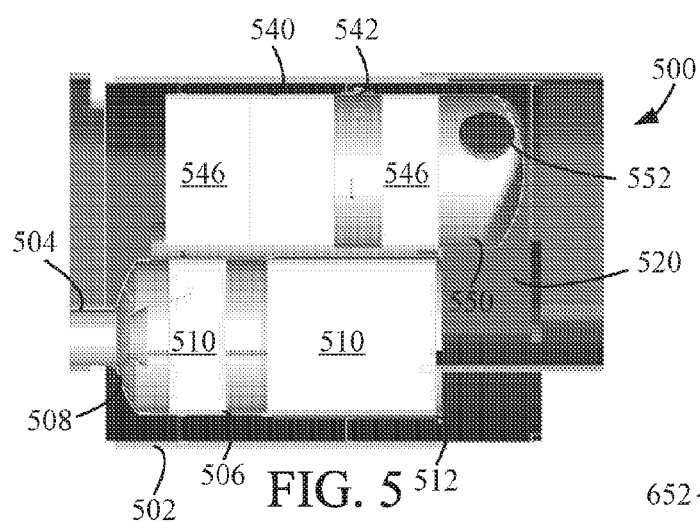
FIG. 5 is a side cross-sectional view of an example integrated selective catalytic reduction system for an exhaust system.

V. Example Integrated Selective Catalytic Reduction System for an Exhaust System FIG. 5 depicts a side cross-sectional view of an integrated selective catalytic reduction system 500 for an exhaust system. The integrated selective catalytic reduction system 500 includes main housing 502 containing a DPF 506 and an SCR catalyst 540. The DPF 506 may be housed within a first inner housing 512 within the main housing 502, and the SCR catalyst 540 may be housed within a second inner housing 542. The first inner housing 512 and second inner housing 542 are positioned within the main housing 502 such that an outlet of the first inner housing 512 is in fluid communication with an interior volume of the main housing 502 and an inlet of the second inner housing is in fluid communication with the main housing 502. In some configurations, a first centerline axis of the first inner housing 512 and a second centerline axis of the second inner housing 542 are parallel. Thus, the first inner housing 512 and second inner housing 542 may be positioned within a shortened longitudinal length by having the first inner housing 512 and second inner housing 542 substantially longitudinally overlap. The integrated selective catalytic reduction system 500 includes an inlet 504 in fluid communication with an engine, such as a diesel engine, to receive exhaust gases output from the engine. In such a configuration, exhaust can flow into the inlet 504, into the first inner housing 512 to the DPF 506, out into the main housing 502 that acts as a decomposition chamber 520, into the second inner housing 542 to the SCR catalyst 540, and out through an outlet 552. In some implementations, one or more turbochargers or other exhaust components may be positioned between the engine and the inlet 504.

The inlet 504 is in fluid communication with the DPF 506 that is configured to remove particulate matter, such as soot, from exhaust gas flowing in the exhaust system. The DPF 506 includes an inlet portion 508, where the exhaust gas is received and allowed to expand to a cross-sectional area of the DPF 506 to increase the area of the exhaust gas received while maintaining a substantial uniformity to the distribution of particulate matter in the exhaust gas.

In some implementations, the DPF 506 may include one or more sensors coupled to the main housing 502 and/or an outer casing of the DPF 506. The one or more sensors may be configured to detect one or more characteristics of the exhaust gas flowing through the DPF 506 (such as $NO_x$ content, CO content, etc.), The exhaust gas exits downstream from one of more filters 510 into a decomposition chamber 520, defined by the main housing 502, after particulate matter is substantially filtered from the exhaust gas and/or converted into carbon dioxide using the filters 510.

The exhaust gas flows from the DPF 506 to the decomposition chamber 520 that is configured to convert a reductant, such as urea, aqueous ammonia, or DEF, into ammonia. The decomposition chamber 520 includes a reductant delivery system having a dosing module configured to dose the reductant into the decomposition chamber 520. In some implementations, the reductant delivery system includes a gaseous ammonia delivery system and/or a liquid reductant delivery system that rapidly converts to ammonia.

The decomposition chamber 520 is in fluid communication with the SCR catalyst 540. That is, exhaust from the decomposition chamber 520 enters the SCR catalyst 540 that is configured to assist in the reduction of $NO_x$ emissions by accelerating a $NO_x$ reduction process between the ammonia and the $NO_x$ of the exhaust gas into diatomic nitrogen, water, and/or carbon dioxide.

The exhaust gas and $NH_3$ mixture flows through one or more catalysts 546. The one or more catalysts 546 may include any suitable catalyst such as, for example, platinum, palladium, rhodium, cerium, iron, manganese, copper, vanadium based catalyst, any other suitable catalyst, or a combination thereof. The one or more catalysts 546 can be disposed on a suitable substrate such as, for example, a ceramic (e.g., cordierite) or metallic (e.g., kanthal) monolith core which can, for example, define a honeycomb structure. A washcoat can also be used as a carrier material for the aforementioned catalysts. Such washcoat materials can include, for example, aluminum oxide, titanium dioxide, silicon dioxide, any other suitable washcoat material, or a combination thereof.

In some implementations, a sensor assembly may be disposed within the main housing 502 and/or an outer casing of the SCR catalyst 540. The sensor assembly may be positioned in between an upstream catalyst 546 and a downstream catalyst 546 to capture a portion of the exhaust gas to be transported to a sensor to detect a $NO_x$ content of the exhaust gas, a $NH_3$ content of the exhaust gas, and/or a ratio of $NO_x$ to $NH_3$ content of the exhaust gas. The sensor assembly may be constructed in accordance with one or more of the embodiments disclosed by U.S. application Ser. No. 13/764,165, entitled "Exhaust Gas Sensor Module," and/or U.S. Pat. No. 8,756,913, entitled "Exhaust Gas Sensor Module, the disclosures of which are hereby incorporated herein in their entirety.

The SCR catalyst 540 also includes an outlet portion 550 in fluid communication with the one or more catalysts 546 and an outlet 552 of the exhaust system. The outlet portion 550 collects the exhaust gas downstream of the one or more catalysts 546.

Figure 7:
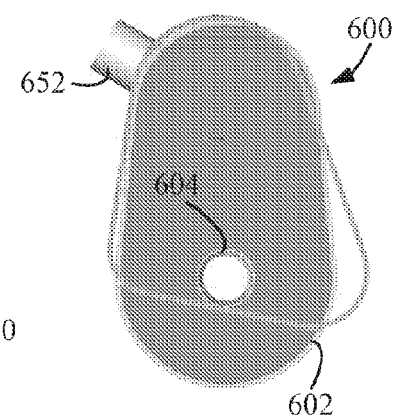
FIG. 7 is a front elevation view of the example single module integrated selective catalytic reduction system of FIG. 6.
Figure 6:
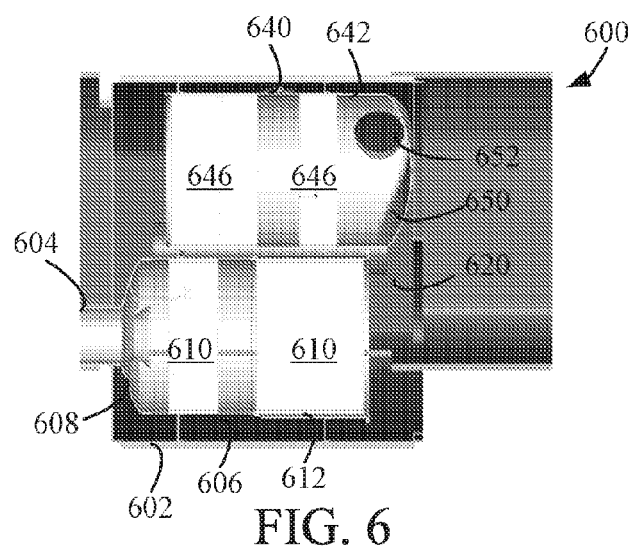
FIG. 6 is a side cross-sectional view of an example single module compact integrated selective catalytic reduction system for an exhaust system.

FIGS. 6-7 depict an integrated selective catalytic reduction system 600 for an exhaust system. The integrated selective catalytic reduction system 600 includes main housing 602 containing a DPF 606 and an SCR catalyst 640. The DPF 606 may be housed within a first inner housing 612 within the main housing 602, and the SCR catalyst 640 may be housed within a second inner housing 642. The first inner housing 612 and second inner housing 642 are positioned within the main housing 602 such that a centerline axis of the first inner housing 612 and the second inner housing 642 are parallel. Thus, the first inner housing 612 and second inner housing 642 may be positioned within a shortened longitudinal length by having the first inner housing 612 and second inner housing 642 substantially longitudinally overlap. The integrated selective catalytic reduction system 600 includes an inlet 604 in fluid communication with an engine, such as a diesel engine, to receive exhaust gases output from the engine. In such a configuration, exhaust can flow into the inlet 604, into the first inner housing 612 to the DPF 606, out into the main housing 602 that acts as a decomposition chamber 620, into the second inner housing 642 to the SCR catalyst 640, and out through an outlet 652. In some implementations, one or more turbochargers or other exhaust components may be positioned between the engine and the inlet 604.

The inlet 604 is in fluid communication with the DPF 606 that is configured to remove particulate matter, such as soot, from exhaust gas flowing in the exhaust system. The DPF 606 includes an inlet portion 608, where the exhaust gas is received and allowed to expand to a cross-sectional area of the DPF 606 to increase the area of the exhaust gas received while maintaining a substantial uniformity to the distribution of particulate matter in the exhaust gas.

In some implementations, the DPF 606 may include one or more sensors coupled to the main housing 602 and/or an outer casing of the DPF 606. The one or more sensors may be configured to detect one or more characteristics of the exhaust gas flowing through the DPF 606 (such as $NO_x$ content, CO content, etc.), The exhaust gas exits downstream from one of more filters 610 into a decomposition chamber 620, defined by the main housing 602, after particulate matter is substantially filtered from the exhaust gas and/or converted into carbon dioxide using the filters 610. In some implementations, the one or more filters 610 may be selected based on an engine flow rate. In some implementations, the one or more filters 610 may be SiC or other type filters. The one or more filters 610 may have a reduced volume in comparison to the one or more filters 510, such as a 25% reduced volume. The reduced filter volume for the one or more filters 610 can be enabled by improved filter technologies or exhaust conditions and/or constituents that allow volume reduction.

The exhaust gas flows from the DPF 606 to the decomposition chamber 620 that is configured to convert a reductant, such as urea, aqueous ammonia, or DEF, into ammonia. The decomposition chamber 620 includes a reductant delivery system having a dosing module configured to dose the reductant into the decomposition chamber 620. In some implementations, the reductant delivery system includes a gaseous ammonia delivery system and/or a liquid reductant delivery system that rapidly converts to ammonia.

The decomposition chamber 620 is in fluid communication with the SCR catalyst 640. That is, exhaust from the decomposition chamber 620 enters the SCR catalyst 640 that is configured to assist in the reduction of $NO_x$ emissions by accelerating a $NO_x$ reduction process between the ammonia and the $NO_x$ of the exhaust gas into diatomic nitrogen, water, and/or carbon dioxide.

The exhaust gas and $NH_3$ mixture flows through one or more catalysts 646. The one or more catalysts 646 may include any suitable catalyst such as, for example, platinum, palladium, rhodium, cerium, iron, manganese, copper, vanadium based catalyst, any other suitable catalyst, or a combination thereof. The one or more catalysts 646 can be disposed on a suitable substrate such as, for example, a ceramic (e.g., cordierite) or metallic (e.g., kanthal) monolith core which can, for example, define a honeycomb structure. A washcoat can also be used as a carrier material for the aforementioned catalysts. Such washcoat materials can include, for example, aluminum oxide, titanium dioxide, silicon dioxide, any other suitable washcoat material, or a combination thereof.

In some implementations, the one or more catalysts 646 may be extruded SCR catalysts. The extruded SCR catalysts may have a reduced volume in comparison to the one or more catalysts 246, such as a 40% reduced volume. It should be noted, however, that the catalysts may be formed by other processes as well. The volume reduction of the one or more catalysts 646 can be enabled by improved SCR technologies or exhaust conditions and/or constituents that allow volume reduction. In some implementations, the one or more catalysts 646 may be selected based on an engine flow rate. In some implementations, the one or more catalysts 646 may include a water resistant and/or water capable substrate mat. That is, the one or more catalysts 646 may include a water capable substrate mat wrapped around the substrate for the one or more catalysts 646 that experiences a substantially reduced performance impact when water is introduced into the substrate mat. In particular, the substrate mat pressure is not significantly reduced during use after exposure to water.

In some implementations, a sensor assembly may be disposed within the main housing 602 and/or an outer casing of the SCR catalyst 640. The sensor assembly may be positioned in between an upstream catalyst 646 and a downstream catalyst 646 to capture a portion of the exhaust gas to be transported to a sensor to detect a $NO_x$ content of the exhaust gas, a $NH_3$ content of the exhaust gas, and/or a ratio of $NO_x$ to $NH_3$ content of the exhaust gas. The sensor assembly may be constructed in accordance with one or more of the embodiments disclosed by U.S. application Ser. No. 13/764,165, entitled "Exhaust Gas Sensor Module," and/or U.S. Pat. No. 8,756,913, entitled "Exhaust Gas Sensor Module, the disclosures of which are hereby incorporated herein in their entirety.

The SCR catalyst 640 also includes an outlet portion 650 in fluid communication with the one or more catalysts 646 and an outlet 652 of the exhaust system. The outlet portion 650 collects the exhaust gas downstream of the one or more catalysts 646. The outlet portion 650 may omit a water trap based on the usage of a water capable substrate mat, thereby eliminating a component from the integrated selective catalytic reduction system 600.

In any of the foregoing example implementations, all exhaust flow from the engine flows through the selective catalytic reduction system 200, 300, 400, 500, 600 via a single inlet 202, 302, 404, 504, 604 and a single outlet 252, 352, 452, 552, 652.

In any of the foregoing example implementations, the DPF 204, 304, 406, 506, 606 may include a selectively removeable diesel particulate filter that is configured to be separately removed from the selective catalytic reduction system 200, 300, 400, 500, 600 through a service opening, such as an access door or portion of a housing containing the DPF 204, 304, 406, 506, 606 and/or the an access door or portion of a housing containing the catalyst 246, 346, 446, 546, 646, without having to remove the selective catalytic reduction system 200, 300, 400, 500, 600 and/or other components of the selective catalytic reduction system 200, 300, 400, 500, 600.

Additionally, a noise or exhaust attenuation component may be coupled to and/or positioned in or around the selective catalytic reduction system 200, 300, 400, 500, 600 in the foregoing implementations, whereby an auxiliary muffler downstream of the selective catalytic reduction system 200, 300, 400, 500, 600 may be eliminated.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
a housing defining a centerline axis, the housing including one or more deflector plates at an inlet of the housing so as to deflect flow outwardly from the inlet;
a diesel particulate filter disposed downstream of the one or more deflector plates within the housing and having a diesel particulate filter center axis aligned with the centerline axis;
a selective catalytic reduction catalyst disposed within the housing downstream of the diesel particulate filter and having a center axis aligned with the centerline axis;
a decomposition chamber disposed within the housing downstream of the diesel particulate filter and upstream of the selective catalytic reduction catalyst; and
a reductant delivery system configured to dose reductant into the decomposition chamber.

2. The system of claim 1, wherein the diesel particulate filter comprises one or more SiC filters.

3. The system of claim 1, wherein the selective catalytic reduction catalyst comprises one or more extruded SCR catalysts.

4. The system of claim 1, wherein the housing has a single inlet and a single outlet.

5. The system of claim 1, wherein the diesel particulate filter is selectively removeable from the single housing through a service opening.

6. The system of claim 1, further comprising an exhaust noise attenuation component.

7. The system of claim 1, wherein the one or more deflector plates are positioned-upstream of the selective catalytic reduction catalyst.

8. The system of claim 1, wherein a diameter of the decomposition chamber defined by the housing is the same as a diameter of the housing containing the diesel particulate filter.

9. An aftertreatment system configured to receive exhaust from an engine, the aftertreatment system including:
- a housing defining a centerline axis, the housing including one or more deflector plates at an inlet of the housing so as to deflect flow outwardly from the inlet;
- a diesel particulate filter disposed downstream of the one or more deflector plates within the housing and having a diesel particulate filter center axis aligned with the centerline axis;
- a selective catalytic reduction catalyst disposed within the housing downstream of the diesel particulate filter and having a center axis aligned with the centerline axis;
- a decomposition chamber disposed within the housing downstream of the diesel particulate filter and upstream of the selective catalytic reduction catalyst; and
- a reductant delivery system configured to dose reductant into the decomposition chamber.

10. The system of claim 9, wherein the diesel particulate filter comprises one or more SiC filters.

11. The system of claim 9, wherein the selective catalytic reduction catalyst comprises one or more extruded SCR catalysts.

12. The system of claim 9, wherein the housing has a single inlet and a single outlet.

13. The system of claim 9, wherein the diesel particulate filter is selectively removeable from the housing through a service opening.

14. The system of claim 9, further comprising an exhaust noise attenuation component.

15. The system of claim 9, wherein the one or more deflector plates are positioned upstream of the selective catalytic reduction catalyst.

16. The system of claim 9, wherein a diameter of the decomposition chamber defined by the housing is the same as a diameter of a portion of the housing containing the diesel particulate filter.

17. A system comprising:
- a main housing defining a volume and having an upstream end and a downstream end;
- a first inner housing housed within the main housing and having an inlet at a first end of the first inner housing and an outlet at a second end of the first inner housing, the outlet of the first inner housing being in fluid communication with the volume defined by the main housing, the first inner housing defining a first centerline axis;
- a second inner housing housed within the main housing and having an inlet at a first end of the second inner housing and an outlet at a second end of the second inner housing, the inlet of the second inner housing being in fluid communication with the volume defined by the main housing, the second inner housing defining a second centerline axis that is parallel to and offset from the first centerline axis;
- a diesel particulate filter disposed within the first inner housing and having a diesel particulate filter center axis aligned with the first centerline axis; and
- a selective catalytic reduction catalyst disposed within the second inner housing downstream of the diesel particulate filter and having a center axis aligned with the second centerline axis;
- wherein the first end of the first inner housing and the first end of the second inner housing are positioned within the main housing at the upstream end of the main housing.

18. The system of claim 17, wherein the volume defined by the main housing is a decomposition chamber.

19. The system of claim 18, wherein the diesel particulate filter comprises one or more SiC filters and the selective catalytic reduction catalyst comprises one or more extruded SCR catalysts.

* * * * *

UNITED STATES PATENT AND TRADEMARK OFFICE
CERTIFICATE OF CORRECTION

PATENT NO. : 10,092,879 B2
APPLICATION NO. : 15/539886
DATED : October 9, 2018
INVENTOR(S) : Randolph G. Zoran et al.

Page 1 of 1

It is certified that error appears in the above-identified patent and that said Letters Patent is hereby corrected as shown below:

On the Title Page

Item (72):
Replace "Carl A. McDonald, Greenwood, IN (US)" with -- A. Carl McDonald, Jr., Greenwood, IN (US) --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*